Jan. 9, 1934. L. N. HAMPTON 1,942,549
FLUID TRANSFER DEVICE
Filed Aug. 7, 1928 3 Sheets-Sheet 1
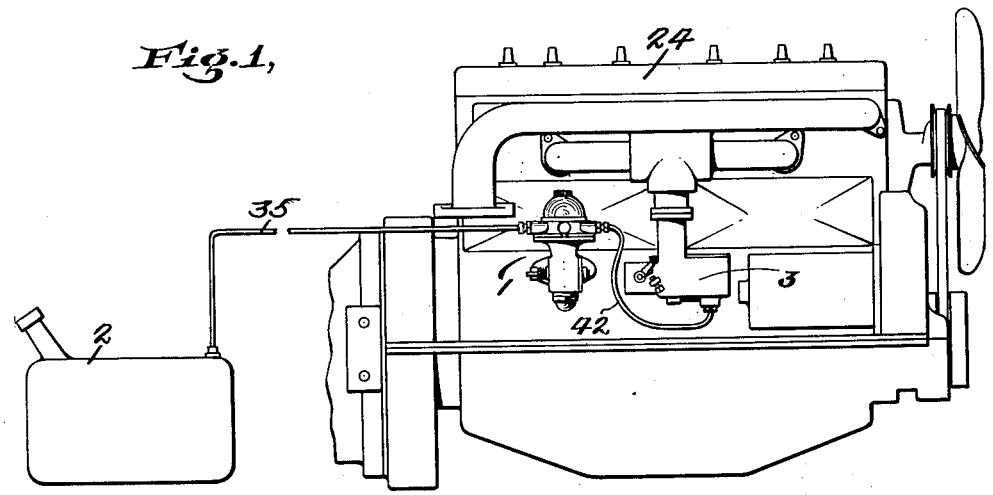
Fig. 1.
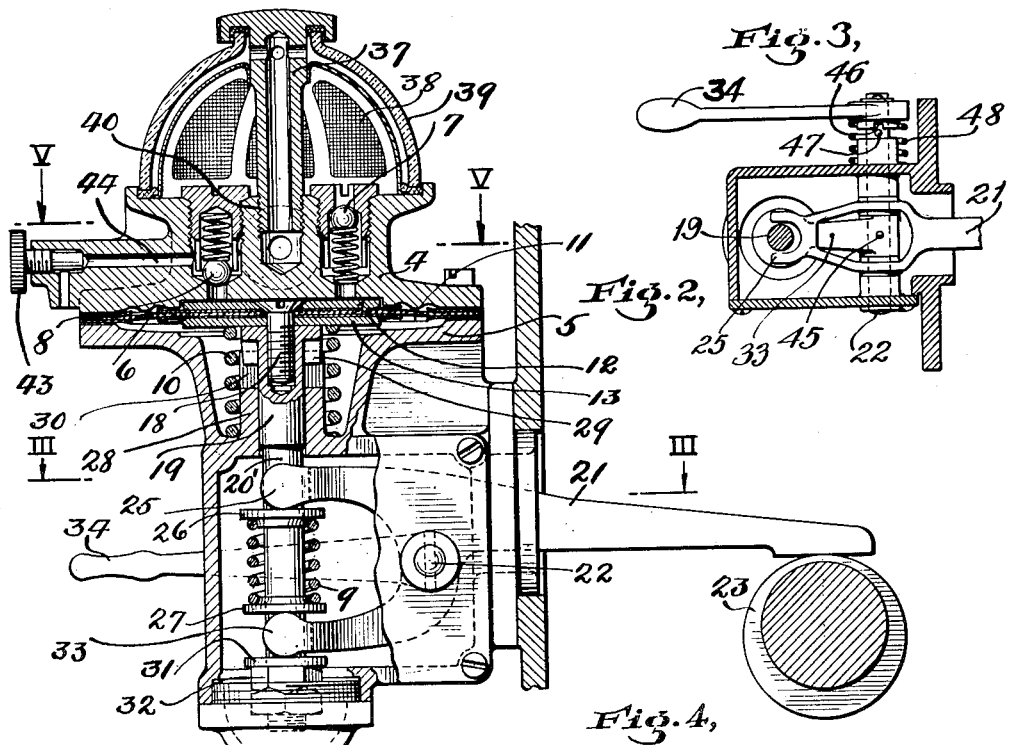
Fig. 2, Fig. 3, Fig. 4,
INVENTOR.
Leon N. Hampton
BY
ATTORNEYS.

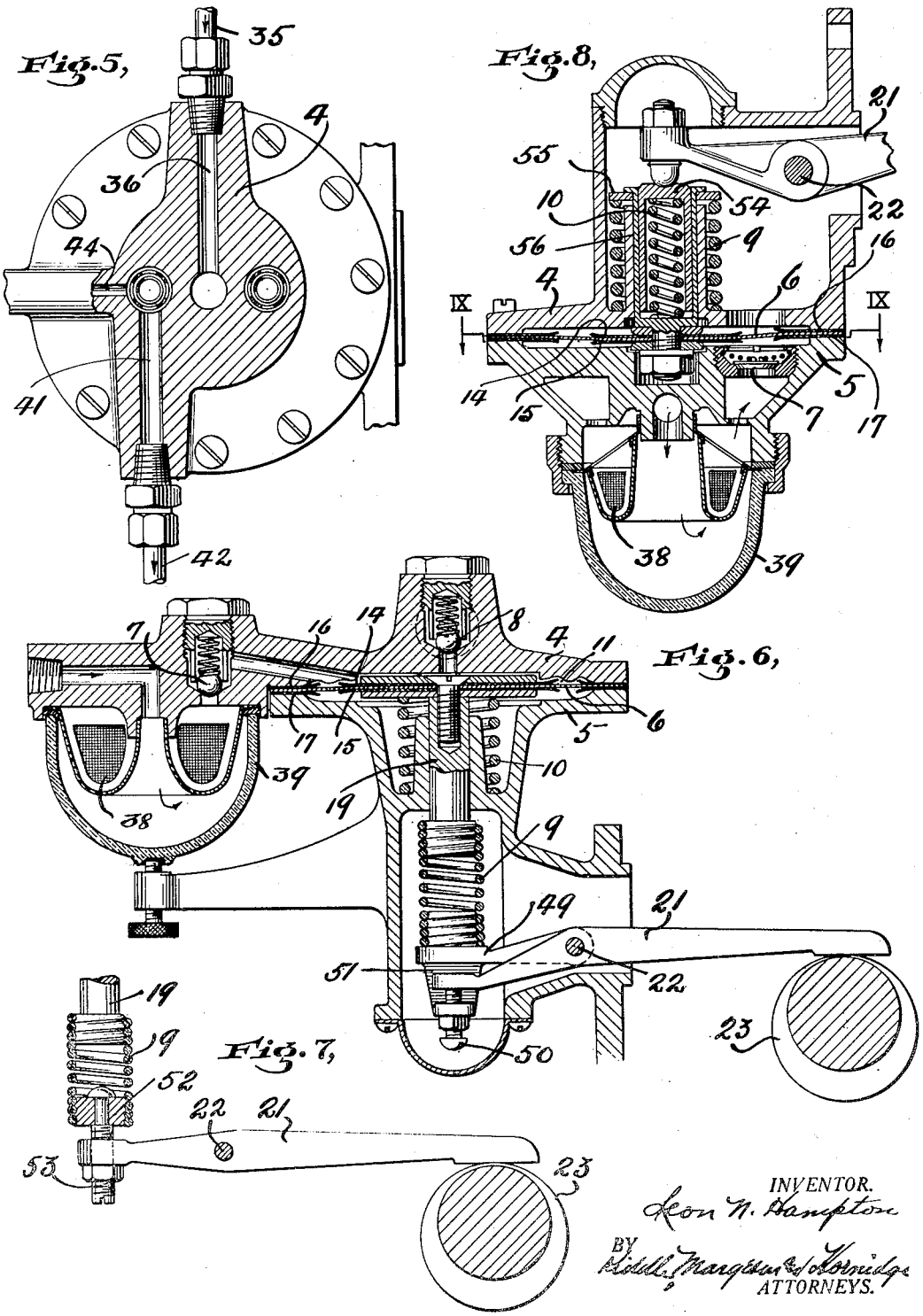

Jan. 9, 1934.      L. N. HAMPTON      1,942,549
FLUID TRANSFER DEVICE
Filed Aug. 7, 1928      3 Sheets-Sheet 3
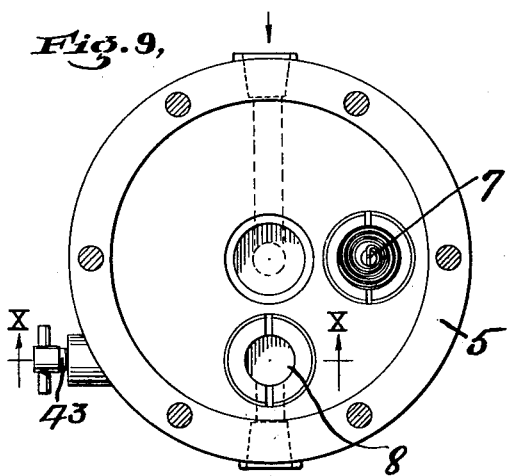
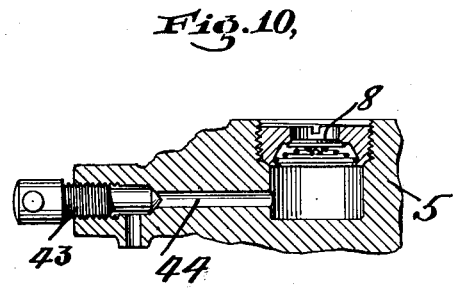
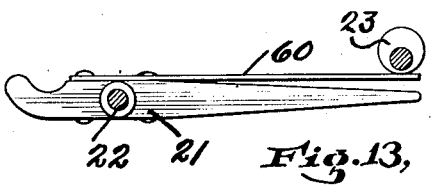
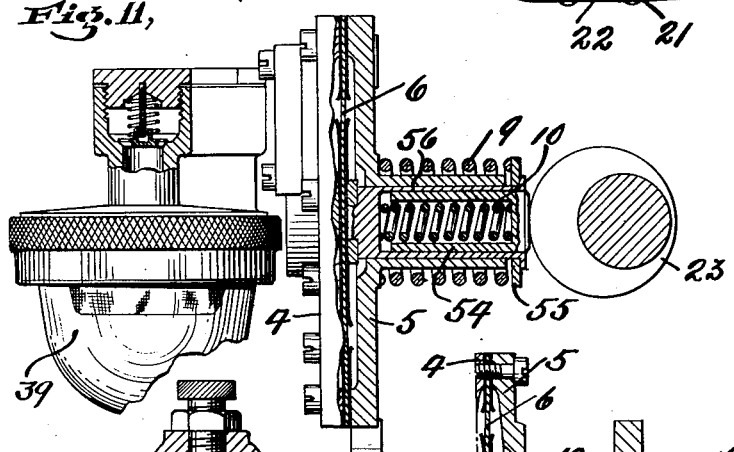
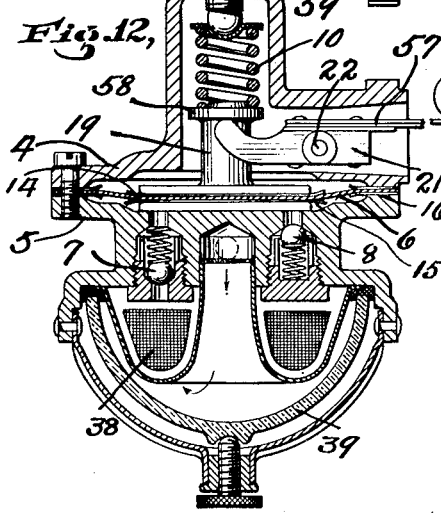
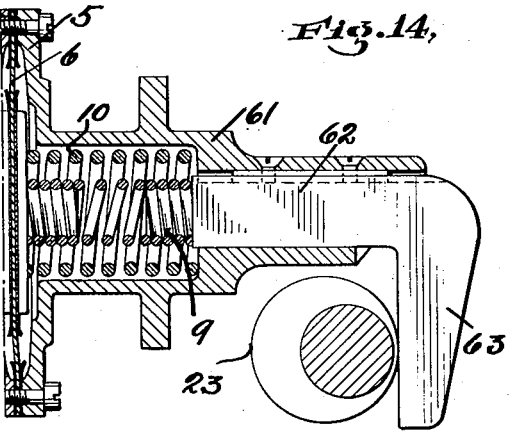
INVENTOR.
Leon N. Hampton
BY
ATTORNEYS.

Patented Jan. 9, 1934

1,942,549

UNITED STATES PATENT OFFICE 1,942,549

FLUID TRANSFER DEVICE

Leon N. Hampton, New York, N. Y., assignor to A C Spark Plug Company, a corporation of Michigan Application August 7, 1928. Serial No. 298,098

6 Claims. (Cl. 103—207)

The present invention relates broadly to improvements in apparatus for effecting transfer of fluids and while capable of many uses is particularly well adapted for delivering fuel from a source of supply to the carbureter of an internal combustion engine for example or for supplying fuel to oil burners.

More specifically my invention relates to mechanically driven pumps comprising a sealed flexible pumping member such as a disc diaphragm, a bellows, etc., wherein the stroke of the pumping member is variable in order to maintain a substantially constant output pressure at varying pumping rates.

One of the objects of my invention is to provide impositive means for displacing the pumping member in either direction alternately, as in this way shock to the pumping member may be avoided, tending to prolong its life as will be understood by those skilled in this art.

A further object of my invention is to provide means whereby there will be constant engagement between a driven member cooperating with the impositive means and the prime mover in order to avoid noisy operation and to this end the construction may be such that the driven member will have considerable follow, thereby compensating for wear and for variations in manufacture.

It is desirable however that the initial displacement of the driven member should not predetermine the limits of the stroke of the pumping member in any way. This may be accomplished for example by providing opposed springs by which the pumping member is moved both in the direction of output and of intake, employing an intake spring which while normally weaker than the output spring nevertheless has sufficient strength to maintain constant engagement between the driven member and the prime mover, means being provided whereby the strength of the intake spring may be increased when desired to exceed that of the output spring, thereby to bring about the desired movement of the pumping member. The output spring may of course be made initially the weaker if for any reason it is desirable to arrange the pump in this way.

When the bias of the impositive means is changed as above pointed out it will be appreciated that there will be a transfer of fluid and that both the lift and delivery characteristics of the device will be controlled by the resultant reaction of the opposed impositive means. It is desirable, therefore, that some means be provided for adjustment and several ways of effecting such adjustment will be described hereinafter.

It is desirable also that the displacement of the pumping member be small during average working conditions, this small displacement of the pumping member tending to prolong its life. It is however desirable to arrange for a possible relatively large displacement in order to assure easy priming and to take care of surge conditions. This means the provision of a pump, the maximum capacity of which will be considerably in excess of the average requirements of the system which it serves. With such a pump it is desirable to arrange the parts so that the displacement of the flexible pumping member from its normal plane when employing a disc type of diaphragm is greater in the direction of output than in the direction of intake as in general the diaphragm will vibrate through only a small percentage of its maximum amplitude and the vibration will be confined to an area close to the limiting position in the direction of intake. I prefer to employ in my improved apparatus diaphragms of the disc type and of uniform strength in bending, such as shown in my Patent No. 1,489,349, dated April 8, 1924.

Another object of the present invention is the provision of an efficient filtering arrangement to be employed in connection with my improved apparatus as well as various constructional details by which the several elements making up the apparatus are made readily accessible for the purpose of repair and renewal as well as initial assembly.

In the accompanying drawings, Fig. 1 is a more or less diagrammatic view showing an installation of my invention in connection with an internal combustion engine;

Fig 2 is a sectional elevational view of one embodiment of my invention;

Fig. 3 is a section on the line III—III of Fig. 2;

Fig. 4 is an enlarged view of a form of pumping member adapted to be employed in my apparatus;

Fig. 5 is a section on the line V—V of Fig. 2;

Fig. 6 is a sectional elevational view of a modification;

Fig. 7 is a part sectional elevational view of a modified form of drive for the pumping member;

Fig. 8 is a sectional elevational view of a further modification;

Fig. 9 is a section on the line IX—IX of Fig. 8;

Fig. 10 is a section on the line X—X of Fig. 9;

Fig. 11 shows in part section a further modified form of my invention;

Fig. 12 is a view in section of a still further modification;

Fig. 13 is an elevation of a modified drive; and

Fig. 14 is a further modified embodiment of the invention.

Referring first of all to Fig. 1, which as above pointed out shows a typical installation of my improved device in detail: The transfer device, designated 1, has been shown in Fig. 1 as applied to an internal combustion engine, and mounted intermediate a fuel supply tank 2 and a carbureter 3. This showing of an installation of my invention is illustrative only and not in any sense definitive or limiting inasmuch as the device is capable of many uses and hence is not to be limited in its application to the supplying of fuel to the carbureter of an internal combustion engine. I wish it to be understood also that the device 1 is operable independently of its own position, independently of its own position relative to the supply and receiving means, and independently of the relative positions of the supply and receiving means.

Referring more specifically to Figs. 2 and 3, my improved device comprises a casing composed of sections 4 and 5, a sealing and pumping member 6, intake valve 7, output valve 8, both spring loaded and mounted in the casing section 4, intake and output springs 9 and 10 respectively mounted in the casing section 5.

The pumping member 6, may if desired be similar to the disc diaphragm of my prior Patent No. 1,489,349, dated April 8, 1924, or it may be constructed as herein illustrated, but in any event is mounted between the casing sections 4 and 5 and seals the pumping chamber 11.

As illustrated in Figs. 2 and 4 the pumping member 6 is an imperforate fabric disc or discs provided centrally on each side with rigid discs 12 and 13, and with central intermediate resilient discs 14 and 15. The edges of the latter are turned slightly out of the plane of the pumping member. At its periphery the member 6 is provided at each side with resilient annuli 16 and 17, having their edges bent slightly out of the plane of the pumping member.

The pumping member together with the discs 12, 13, 14 and 15 are all held together by a screw 18 extending into a stem 19 to be referred to hereinafter.

The members 14, 15, 16 and 17 are provided for the purpose of reinforcing the flexible fabric portion of the diaphragm pumping member 6 and to prevent bulging, thus protecting the dangerous sections as well as increasing the capacity of the pump by reducing the losses which occur when the diaphragm bulges one way and then the other while being vibrated.

The pumping member structure may be assembled into a unit by spinning or otherwise permanently attaching a uniting member 20 to the periphery thereof, or reliance may be placed entirely upon the clamping of the pumping member and its associated parts comprising the diaphragm between the sections 4 and 5 of the casing of the device.

The type of pumping member just described will provide extreme flexibility, insure long life and maximum capacity of the pump. It is to be understood, however, that this type of diaphragm is not essential to the successful operation of my device, and that if desired a bellows type of pumping member as distinguished from a disc diaphragm may be substituted.

The section 5 of the casing of the device receives the stem 19 which as has been pointed out is secured rigidly to the diaphragm. This stem is reduced at 20' and receives the forked end of a driven lever 21, fulcrumed at 22 and driven in the direction of intake by a cam 23. This cam, when my device is used as illustrated in Fig. 1, is driven by the internal combustion engine 24 in any suitable manner.

The fork 25 of the lever 21 is in constant engagement with a disc 26 which is slidably mounted on the stem 19. Intermediate this disc 26 and a similar disc 27 also carried by the stem 19 is impositive operating means in the form of the intake spring 9 above referred to. This spring is always under compression.

Surrounding the stem 19 at the upper end thereof adjacent the diaphragm is the output spring 10 which is also always under compression. This output or delivery spring not only surrounds the stem 19 but also surrounds a projection 28 formed interiorly of the lower section 5 of the casing of the device. The stem 19 has a reciprocatory movement in the projection 28.

The stem where it passes through projection 28 is provided with fins 29 received in slots 30 provided in the projection. This fin and slot arrangement constitutes a guide for the stem 19 and prevents twisting of the stem.

On the lower end of the stem 19 is provided a washer or disc 31 loosely mounted thereon and adjustable by a nut 32 screwed upon the stem. The two discs or washers 27 and 31 are slightly spaced from each other and receive between them the forked end of a lever 33 which also is pivoted on the fulcrum 22 for the lever 21 and is operated through manually operated lever 34. This lever 33 also follows the stem 19 when the pump is mechanically operated.

It will be apparent from the foregoing that rotation of the cam 23 from the position shown in Fig. 2 will move the outer end of the lever 21 upwardly, thereby depressing the disc 26 and increasing the reaction of the intake spring 9 until it exceeds the reaction of the delivery spring 10, whereupon the pumping member 6 will be moved downwardly on its intake stroke against the action of the delivery spring 10, this movement of the pumping member unseating the intake valve 7 and drawing fluid from the supply tank 2 through the pipe 35 and intake port 36 to the center of the casing 4, the fluid then passing upwardly through the filter assembly stud 37 to spill over the filter 38 finally to enter the pump chamber 11 between the upper face of the pumping member 6 and the lower side of the upper section 4 of the casing of the device, it being understood that the fluid after being filtered flows past the intake valve 7 which as above described is at this time unseated.

The casing 39 of the filter may be of transparent material such as glass if desired and is held in place on the upper section 4 of the casing of the device by the filter assembly stud 37 which screws into the casing section 4 as shown at 40. The filter is supported on a perforated detail to facilitate assembly and handling.

As the cam continues the movement of the lever 21 on the intake stroke of the pumping member 6 the high part of the cam will finally move from beneath the lever, to permit the delivery spring 10 to function to move the diaphragm on its delivery stroke. The intake spring, however, is always under some tension and hence the lever 21 due to this fact will always be in pressure engagement with the cam irrespective of the position of the latter. This is the fact even if considerable wear should occur in the cam or lever or both and will effectually eliminate the noise which would be present were the cam and lever allowed to separate.

The initial displacement, however, of the intake spring 9 necessary to assure a reliable engagement margin is insufficient to build up an appreciable pressure reaction but is just sufficient fluid passages and inlet and outlet valves in said section, removable valve plugs forming a ready means of access to said valves, and a fluid filter detachably secured to said section and enclosing both of said valve plugs, said filter being secured to said casing section by an assembly stud which is provided with a fluid passage communicating with a fluid passage in said casing section.

4. A fluid transfer device comprising a pumping diaphragm, a stem attached to said diaphragm, operating means including an engine driven lever for normally reciprocating said stem, a second lever engaging an abutment on said stem and movable therewith, and a manually operable handle connected to said second lever by means of a clutch whereby said diaphragm stem may be reciprocated when desired independently of said engine driven lever.

5. A fluid transfer device comprising a pumping diaphragm, a spring through which movement of the diaphragm in one direction is normally effected, an adjustable abutment for said spring, and manually operable means to move said diaphragm independently of said spring, said means including an element engaging said adjustable abutment.

6. A fluid transfer device comprising in combination a casing formed in two sections, a pumping diaphragm interposed between said sections, fluid passages and inlet and outlet valves in one of said sections, a pumping chamber constituted by said diaphragm and one side of said section, valve plugs removably mounted on the other side of said section forming a ready means of access to said valves, and a fluid filter detachably secured to said other side of said section and enclosing both of said valve plugs.

LEON N. HAMPTON.